United States Patent

Yoshimura et al.

[11] Patent Number: 5,502,343
[45] Date of Patent: *Mar. 26, 1996

[54] MINIATURE MOTOR

[75] Inventors: Kazutoshi Yoshimura; Kenji Hagiwara; Isao Shibuya, all of Chiba, Japan

[73] Assignee: Mabuchi Motor Co., Ltd., Chiba, Japan

[*] Notice: The term of this patent shall not extend beyond the expiration date of Pat. No. 5,357,159.

[21] Appl. No.: 260,532

[22] Filed: Jun. 16, 1994

[30] Foreign Application Priority Data

Jul. 23, 1993 [JP] Japan ................... 5-182609

[51] Int. Cl.$^6$ .................................. H02K 13/06
[52] U.S. Cl. .................... 310/220; 310/40 MM; 310/228
[58] Field of Search .................... 310/40 MM, 220, 310/221, 228, 88, 89, 52, 54, 55, 57

[56] References Cited

U.S. PATENT DOCUMENTS 1,703,372  3/1955  Savage ..................... 310/228
4,680,495  7/1987  Chiampas et al. ......... 310/220
5,357,159  10/1994  Hagiwara ................ 310/40 MM

FOREIGN PATENT DOCUMENTS 0209617  1/1987  European Pat. Off. ....... H02K 13/10
60-162449  8/1985  Japan .

OTHER PUBLICATIONS

Patent Abstracts of Japan, C field, vol. 10. No. 219.
Patent Abstracts of Japan, E field, vol. 9, No. 332.

*Primary Examiner*—Mark O. Budd
*Attorney, Agent, or Firm*—McGlew and Tuttle

[57] ABSTRACT

A miniature motor comprising a case made of a metallic material, formed into a bottomed hollow tubular shape and having a permanent magnet fixedly fitted to the inner circumferential surface thereof, a rotor having an armature facing the permanent magnet and a commutator, and a case cap fitted to an open end of the case, and having brushes for making sliding contact with the commutator and input terminals electrically connected to the brushes; the rotor being rotatably supported by bearings provided on the bottom of the case and the case cap, in which an internal space defined by the case and the case cap is filled with an atmosphere of a polymer having a weight-average molecular weight of 50–5000.

6 Claims, 1 Drawing Sheet

MINIATURE MOTOR

BACKGROUND OF THE INVENTION AND RELATED ART STATEMENT

This invention relates generally to a miniature motor used for audio equipment, video equipment, precision equipment, etc., and more specifically to a miniature motor on which improvement has been made so that stable motor performance can be achieved by preventing the abnormal wear of the sliding contact surface of the commutator and the generation of polymers caused by sliding contact between the commutator and the brushes.

FIG. 1 is a longitudinal sectional front view of the essential part of a miniature d-c motor to which this invention is applied. In FIG. 1, numeral 1 refers to a case made of a metallic material, such as mild steel, formed into a bottomed hollow tubular shape and having an arc-segment shaped permanent magnet 2 fixedly fitted to the inner circumferential surface thereof. In the case 1 fitted is a rotor 5 comprising an armature 3 facing the permanent magnet 2 and a commutator 4. Numeral 6 refers to a case cap made of an insulating material, such as a synthetic resin, and formed so as to be fitted to an open end of the case 1. Numeral 7 refers to a brush arm adapted so as to make sliding contact with the commutator 4 and fitted to the case cap 6, together with an input terminal 8 electrically connected to the brush arm 7. Numerals 9 and 10 refer to bearings each fixedly fitted to the bottom of the case 1 and the central part of the case cap 6, respectively, to rotatably support a shaft 11 constituting the rotor 5.

With the aforementioned construction, when current is fed from the input terminals 8 to the armature 3 via the brush arms 7, and the commutator 4 constituting the rotor 5, rotating force is imparted to the armature 3 placed in a magnetic field formed by the permanent magnet 2 fixedly fitted to the inner circumferential surface of the case 1, causing the rotor 5 to rotate. This causes external equipment (not shown) to be driven via the shaft 11 on the output side.

In a conventional type of miniature motor having the aforementioned construction, brushes (not shown) provided at the tips of the brush arms 7 and the commutator 4 may be worn out in a short period due mainly to arc discharge or Joule heat generated at the sliding contact area between the brushes and the commutator 4, or the physical contact between the brushes and the commutator 4. This abnormal wear of the brushes and the commutator 4 could deteriorate the electrical connection between the brushes and the commutator 4 and therefore the stability of the initial motor performance, reducing the service life of the motor.

When such a miniature motor is used in an atmosphere containing an organic gas, black-colored insulating polymers are produced on the sliding contact area between the brushes and the commutator 4 owing to the aforementioned arc discharge or Joule heat. These insulating polymers may make the state of contact between the brushes and the commutator 4 unstable, increasing contact resistance. This could also reduce the service life of the motor.

To overcome the above problems, a construction where polyvalent alcohol, etc. is encapsulated in the motor case to produce an atmosphere of the polyvalent alcohol has been proposed (refer to Japanese Published Unexamined Patent Application No. Sho-60 (1985)-162449). Because of its small molecular weight, the polyvalent alcohol readily evaporate, making its atmosphere in the motor case short-lived. Thus, the polyvalent alcohol has an insufficient effect in extending motor life.

SUMMARY OF THE INVENTION

It is the first object of this invention to provide a miniature motor that can prevent the sliding contact surface of the commutator with the brushes from being subjected to abnormal wear and being contaminated from polymers.

It is the second object of this invention to provide a miniature motor having a long service life and stable performance by reducing and stabilizing contact resistance between the commutator and the brushes.

DETAILED DESCRIPTION OF THE EMBODIMENTS

Figure 1:
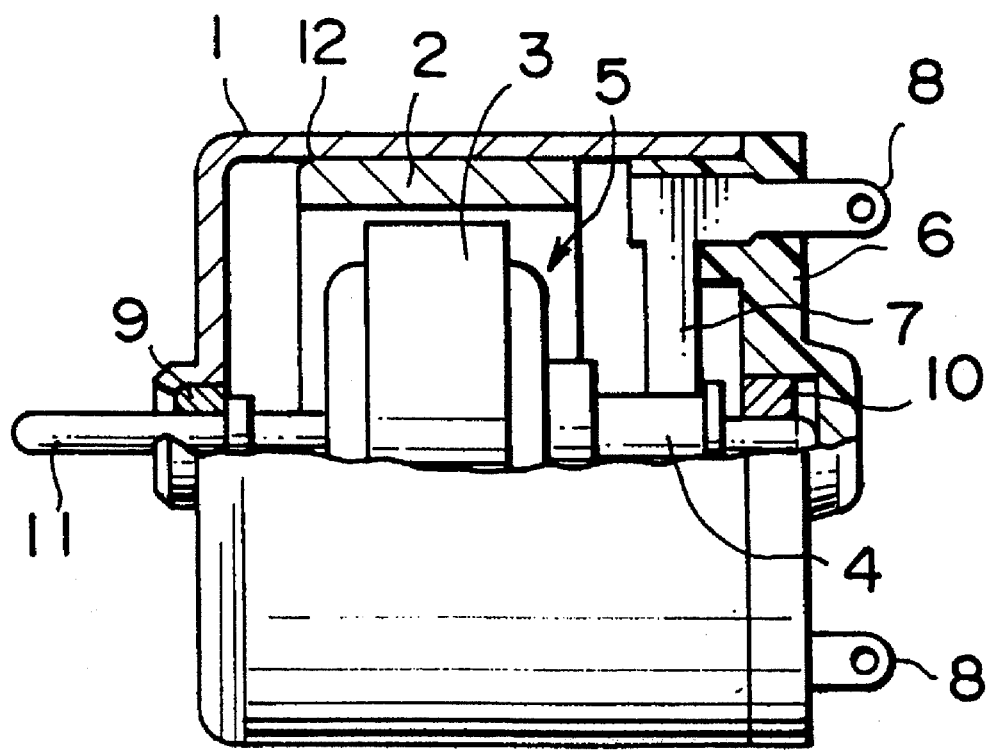
FIG. 1 is a longitudinal sectional view of the essential part of a miniature motor to which this invention is applied.

Ten miniature motors were prepared, in each five of which polyethylene glycol caprinate diester and polyethylene glycol laurate monoester were separately filled into a gap 12 between the case 1 and the permanent magnet 2 shown in FIG. 1 to maintain an atmosphere of either of these polymers in an internal space defined by the case 1 and the case cap 6.

Miniature motors whose internal atmosphere was not adjusted, and miniature motors whose internal atmosphere was formed into that of polyvalent alcohol (diethylene glycol, for example), as disclosed in the aforementioned Japanese Published Unexamined Patent Application No. Sho-60(1985)-162449, were also prepared as control examples.

Table 1 shows the results of cyclic tests in which a 30-g-cm pulley load was applied to the miniature motors each having a specification of 12 V, about 1.3 W and 4,400 rpm, which were operated in a mode of 2-sec stop-4-sec clockwise rotation-2-sec stop-4-sec counterclockwise rotation.

TABLE 1

| Classification | Atmosphere | No. | Time elapsed till motor shutdown (hr) | Average life (hr) |
|---|---|---|---|---|
| This invention | Polyethylene glycol diester caprinate | 1 | (1200) | More than 1200 |
| | | 2 | (1200) | |
| | | 3 | (1200) | |
| | | 4 | (1200) | |
| | | 5 | (1200) | |
| | Polyethylene glycol monoester laurate | 1 | (1200) | More than 1200 |
| | | 2 | (1200) | |
| | | 3 | (1200) | |
| | | 4 | (1200) | |
| | | 5 | (1200) | |
| Control example (1) | Ethylene glycol | 1 | 605 | 498 |
| | | 2 | 433 | |
| | | 3 | 480 | |
| | | 4 | 407 | |
| | | 5 | 565 | |
| Control example (2) | Atmosphere | 1 | 490 | 410 |
| | | 2 | 419 | |
| | | 3 | 373 | |
| | | 4 | 348 | |
| | | 5 | 419 | |

As is evident from Table 1, with the control example (2) where the internal atmosphere was not adjusted at all, there is a scatter in the time elapsed until the motors tested were shut down due to wear, and the life of the motors is extremely short. The service life of the motors of the control example (1) is extended by only about 1.2 times, and there is a scatter in the time elapsed till motor shutdown.

The miniature motors of this invention, on the other hand, can be rotated without stoppage even 1200 hours after the start of motor operation. Thus, it was confirmed that the average life of the motors of this invention is extended by more than 2.9 times that of the control example (2) and by more than 2.4 times.

That is, the vapor evolved gradually from the polymer provided as an atmosphere-forming material in the internal space defined by the case and the case cap is adsorbed by the sliding contact area between the commutator and the brushes, acting as a lubricant. Thus, the abnormal wear of the sliding contact area and the generation of polymers can be prevented. These atmosphere-forming materials are difficult to decompose or oxidize at normal temperatures, stable to light and prolonged heating, and have good weather resistance and aging resistance.

Polymers to be used as atmosphere-forming materials in this invention should preferably be of weight-average molecular weights of 250–5000.

In this invention, a polymer as an atmosphere-forming material can be provided by soaking a porous material, such as absorbent wadding, felting or sponge, with it, or by causing the polymer to impregnate, deposit, adsorb, percolate, or mix with the permanent magnet, case, armature, commutator, brushes, brush arms, case cap, bearings, bearing oil and other component members, or by inserting or causing to infiltrate the polymers in between these component members. In short, any means that can produce an atmosphere of the aforementioned atmosphere-forming material around the sliding contact area between the commutator and the brushes may be used.

Polyoxyalkylene glycol diester, for example, may be used in this invention as an atmosphere-forming polymer. In addition to the polyethylene glycol diester caprinate (weight-average molecular weight [hereinafter referred to as Mw for short]=708) shown in Table 1,

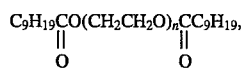

the following polymers are also available: Polyethylene glycol diester laurate (Mw=764),

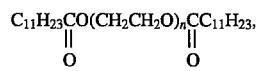

polyethylene glycol diester myristate (Mw=820),

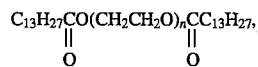

polyethylene glycol diester palmitate (Mw=876),

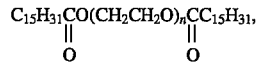

polyethylene glycol diester stearate (Mw=932),

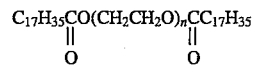

polypropylene glycol diester myristate (Mw=820),

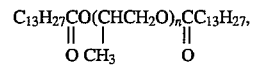

and polypropylene glycol diester palmitate (Mw=876),

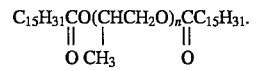

Furthermore, polyoxyalkylene glycol monoester, for example, may be used in this invention as atmosphere-forming polymers. In addition to the polyethylene glycol monoester laurate (Mw=382) shown in Table 1,

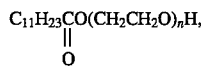

the following polymers are also available: Polyethylene glycol monoester caprinate (Mw=854),

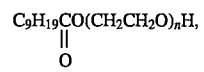

polyethylene glycol monoester myristate (Mw=410),

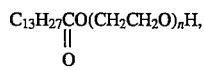

polyethylene glycol monoester palmitate (Mw=438),

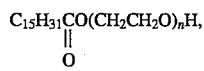

and polyethylene glycol monoester stearate (Mw=466),

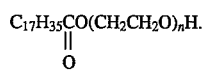

This invention having the aforementioned construction and operation, can prevent the initial wear of a sliding contact area between the commutator and the brushes, and can prevent insulating polymers from being generated on the sliding contact area between the commutator and the brushes even in an organic-gas atmosphere since the sliding contact area is protected by a monomolecular or polymolecular film consisting of polymers as atmosphere-forming materials. Consequently, this invention can achieve effects of reducing and stabilizing contact resistance, and thereby stabilizing motor performance and extending the life of the motor.

What is claimed is:

1. A miniature motor, comprising:

a case made of metallic material, formed into a bottomed hollow tubular shape and having a permanent magnet fixedly fitted to the inner circumferential surface thereof;

a rotor having an armature facing said permanent magnet;

a commutator;

a case cap fitted to an open end of said case;

brushes for making sliding contact with said commutator;

input terminals electrically connected to said brushes, said input terminals being connected to said case cap;

bearings provided on said bottom part of said case and provided on said case cap, said rotor beam rotatably supported by said bearings;

an internal space defined by said case and said case cap being filled with an atmosphere of a polymer having a weight-average molecular weight of 250–5000, said polymer being polyoxyalkylene glycol diester, or polyoxyalkylene glycol monoester.

2. A miniature motor as claimed in claim 1, wherein any one of polyethylene glycol diester caprinate,
polyethylene glycol diester laurate,
polyethylene glycol diester myristate,
polyethylene glycol diester palmitate,
polyethylene glycol diester stearate,
polypropylene glycol diester myristate, and
polypropylene glycol diester palmitate
of polyoxyalkylene glycol diester family is used as a polymer forming an atmosphere.

3. A miniature motor as claimed in claim 1, wherein any one of polyethylene glycol monoester caprinate,
polyethylene glycol monoester laurate,
polyethylene glycol monoester myristate,
polyethylene glycol monoester palmitate, and
polyethylene glycol monoester stearate
of polyoxyalkylene glycol monoester family is used as a polymer forming an atmosphere.

4. A miniature motor, comprising:

a case made of metallic material, formed into a bottomed hollow tubular shape and having a permanent magnet fixedly fitted to the inner circumferential surface thereof;

a rotor having an armature facing said permanent magnet;

a commutator;

a case cap fitted to an open end of said case;

brushes for making sliding contact with said commutator;

input terminals electrically connected to said brushes, said input terminals being connected to said case cap;

bearings provided on said bottom part of said case and provided on said case cap, said rotor beam rotatably supported by said bearings;

an internal space defined by said case and said case cap being at least partially filled with a polymer atmosphere having a weight-average molecular weight of 250–5000, said polymer being selected from the group comprising polyoxyalkylene glycol diester, or polyoxyalkylene glycol monoester.

5. A miniature motor as claimed in claim 4, wherein any one of polyethylene glycol diester caprinate,
polyethylene glycol diester laurate,
polyethylene glycol diester myristate,
polyethylene glycol diester palmitate,
polyethylene glycol diester stearate,
polypropylene glycol diester myristate, and
polypropylene glycol diester palmitate
of polyoxyalkylene glycol diester family is used as a polymer forming an atmosphere.

6. A miniature motor as claimed in claim 4, wherein any one of polyethylene glycol monoester caprinate,
polyethylene glycol monoester laurate,
polyethylene glycol monoester myristate,
polyethylene glycol monoester palmitate, and
polyethylene glycol monoester stearate
of polyoxyalkylene glycol monoester family is used as a polymer forming an atmosphere.

\* \* \* \* \*